Feb. 20, 1945.    J. A. ROBINSON    2,369,799
TESTING APPARATUS
Filed Sept. 20, 1941
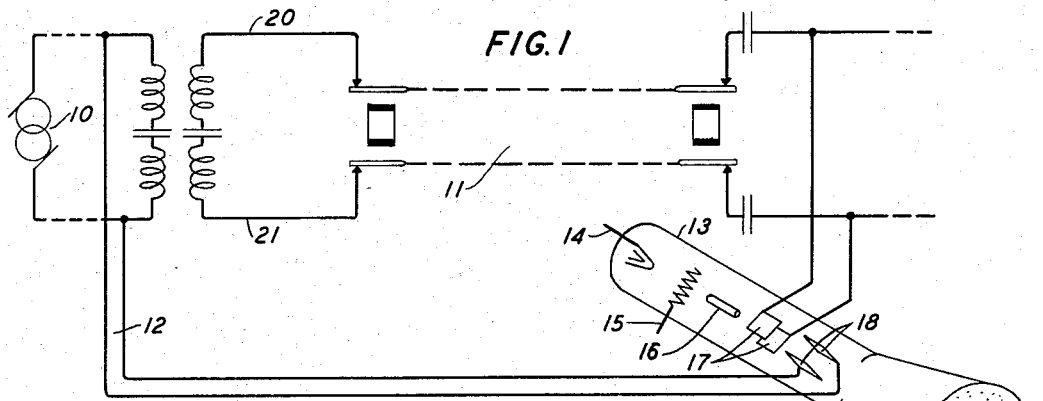
FIG. 1
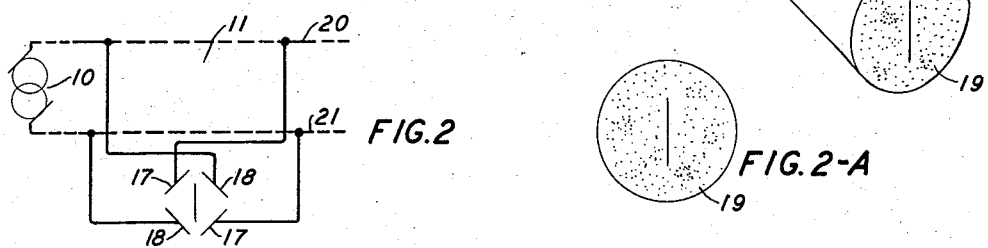 FIG. 2   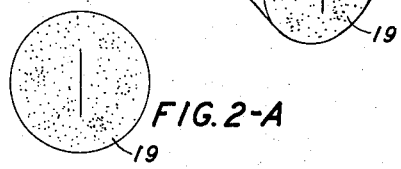 FIG. 2-A
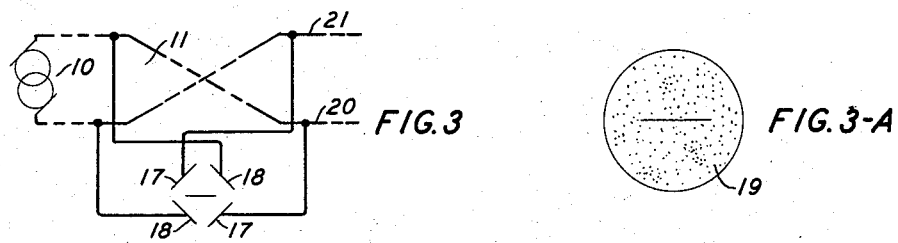 FIG. 3   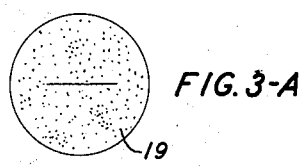 FIG. 3-A
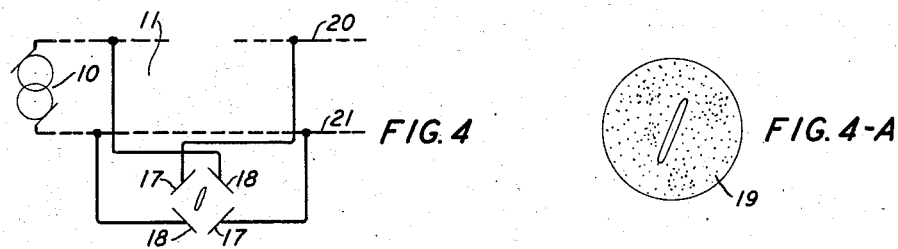 FIG. 4   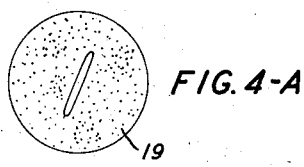 FIG. 4-A
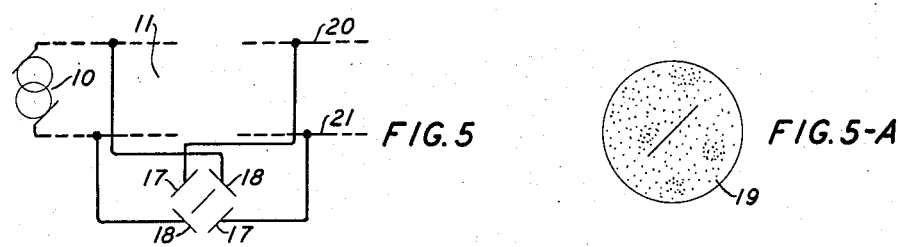 FIG. 5   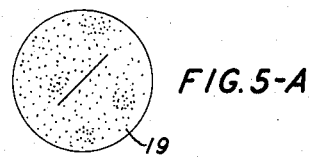 FIG. 5-A
INVENTOR
J. A. ROBINSON
BY
ATTORNEY Patented Feb. 20, 1945

2,369,799

UNITED STATES PATENT OFFICE 2,369,799

TESTING APPARATUS

John A. Robinson, New York, N. Y., assignor to Western Electric Company, Incorporated, New York, N. Y., a corporation of New York Application September 20, 1941, Serial No. 411,701

2 Claims. (Cl. 179—175.3)

This invention relates to testing apparatus and more particularly to a device for checking electrical circuits for conductor reverses and opens.

Assurance that no reverses exist between the tip and ring conductors of telephone circuits is of considerable importance in switchboard equipment. The serious nature of reverses can be appreciated when it is realized that a turnover in the tip and ring sides of an outgoing line will result in improper operation of ringing, signaling or supervisory equipment. It would, moreover, cause confusion in shooting trouble involving the reversed line and could introduce misleading results in the case of routine maintenance tests.

It is customary in shop testing to make a series of buzz tests through the various circuits on telephone equipment to insure that the tip and ring conductors are electrically continuous. Another method is to check wire colors on either the tip or ring sides. Such tests, while wholly effective, consume considerable time and introduce the danger of human error.

Accordingly, this invention contemplates apparatus which simplifies the checking of two-wire electrical circuits for reverses and opens, and eliminates the human factor involved in such checking operations.

The object of the invention is to provide a distinctive visual indication for conductor reverses as well as for single and double opens when encountered in the testing of telephone circuits.

In a specific embodiment, the invention contemplates the use of a cathode ray oscilloscope embodying pairs of vertical and horizontal deflecting plates, an electron beam and a fluorescent screen. A source of fundamental sinusoidal waves is simultaneously applied to the input side of the circuit under test and to one pair of deflecting plates, and the voltage appearing at the output side of the circuit is impressed on the other pair of deflecting plates. The voltages thus impressed on the two pairs of deflecting plates cause a distinctive trace or pattern to appear on the fluorescent screen of the oscilloscope.

In accordance with a particular feature of the invention a distinctively characteristic trace or pattern appears on the fluorescent screen of the oscilloscope for each of the possible conditions which may be encountered during the testing of the electrical circuits, thus rendering it possible to make an immediate visual check of the conductor turnover simultaneously with the transmission measurement or conductor continuity.

The invention will be readily understood from the following description taken together with the accompanying drawing, in which:

Fig. 1 illustrates, diagrammatically, a two-wire circuit such as a telephone line circuit, and a cathode ray oscilloscope whose horizontal and vertical deflecting plates are connected to the input and output sides, respectively, of the line in a manner such that a distinctive trace or pattern is produced on the fluorescent screen of the oscilloscope for the normal and each unstandard condition of the line;

Fig. 2 illustrates, schematically, the connections of the oscilloscope deflecting plates to a line whose conductors are not reversed and are electrically continuous;

Fig. 2A is an oscillogram achieved in accordance with either Fig. 1 or Fig. 2;

Fig. 3 illustrates schematically the oscilloscope connected to a line whose conductors are reversed;

Fig. 3A is an oscillogram achieved in accordance with Fig. 3;

Fig. 4 illustrates schematically the oscilloscope connected to a line, one of whose conductors is open;

Fig. 4A is an oscillogram achieved in accordance with Fig. 4;

Fig. 5 illustrates schematically the oscilloscope connected to a line, both of whose conductors are open; and Fig. 5A is an oscillogram achieved in accordance with Fig. 5.

Referring to Fig. 1, a source 10 supplies fundamental sinusoidal waves of suitable frequency to parallel circuits 11 and 12, the latter of which terminates in a cathode ray oscilloscope 13 of well-known structure, embodying at least a cathode 14, a control grid 15, an anode 16, a pair of vertical deflecting plates 17, 17, a pair of horizontal deflecting plates 18, 18 and an electron beam to produce a trace or pattern on a fluorescent screen 19.

The circuit 11 illustrates schematically a telephone line circuit. It is to be understood that the particular representation of circuit 11 has been chosen for illustrative purposes only, and may embody elements and connections other than those shown. This circuit has its output connected directly to the two vertical deflecting plates 17 of the oscilloscope 13 so that the voltage at the output end of the circuit 11 is impressed on these two vertical plates.

The circuit 12 is connected directly across the supply source 10, as is also the input side of line 11, and terminates in the two horizontal deflecting plates 18, 18 of the oscilloscope 13. Therefore, the voltage of the source 10 is impressed simultaneously on the input side of the line 11 and on the horizontal deflecting plates 18.

It will now be assumed that the line 11 as tested, is in normal condition, that is, there is no reversal of the tip and ring conductors 20 and 21 and that each conductor is electrically continuous. Under these conditions, as schematically represented by Fig. 2, the voltage at the input side of line 11, which is the voltage of the source 10, is applied directly to the horizontal deflecting plates 18, 18 while the voltage at the output side of the line 11 is applied to the vertical deflecting plates 17, 17. With the voltages thus applied, the resulting trace of the electron beam on the fluorescent screen 19 persists as a substantially continuous indication extending along a substantially vertical axis, as illustrated in the oscillogram of Fig. 2A as well as in Fig. 1. An attendant testing the line 11 and observing the characteristic vertical trace on the fluorescent screen is immediately advised that the line is in normal condition.

Fig. 3 shows the line wires of line 11 transposed or reversed. Under these conditions the voltage of the source 10, which is the voltage at the input side of the line, is impressed on the horizontal deflecting plates 18, 18, as in the preceding case. While the output voltage of the line 11 is impressed on the vertical deflecting plates 17, 17, as in the case of a normal line, it will be noted that the polarities of the vertical plates 17, 17 are reversed in time relation with respect to the polarities of the same plates in Fig. 2. This is caused by the reversal of the conductors of the line 11. The resulting trace of the electron beam on the fluorescent screen 19 under this condition persists as a continuous pattern extending in a substantially horizontal axis as illustrated by the oscillogram of Fig. 3A. An attendant or tester, noting this characteristic trace is immediately advised that the tip and ring conductors of the line 11 are transposed.

Fig. 4 illustrates a condition in which the tip conductor 20 of the line 11 is open-circulated. It will be noted that in this case the left-hand vertical deflecting plate 17 is open-circuited and that the left-hand horizontal plate 18 and the right-hand vertical plate 17 are connected to the same side of the line while the right-hand vertical plate 18 is connected to the other side of the line 11. Thus, the left-hand plate 18 and the right-hand plate 17 cooperate in working against the right-hand plate 18 to cause the electron beam to trace substantially the oscillogram illustrated in Fig. 4A.

In Fig. 5 both line conductors are open so that no potential is impressed on the vertical deflecting plates 17. Thus, only the horizontal plates 18 function in this case to achieve the oscillogram shown in Fig. 5A.

While the oscillograms illustrated in the drawing to interpret the various conditions of the line 11 are shown as precisely defined patterns or traces, it is to be understood that the particular traces illustrated would result only under conditions wherein the voltages applied to the horizontal deflecting plates 18, 18 and to the vertical deflecting plates 17, 17 are equal and in phase. It is obvious that the variation in voltages applied to the two sets of deflecting plates as well as in the phase relation will depend to a considerable extent upon the length of the line 11 and to some extent on the frequency of the source 10, and that the resulting traces depicted on the fluorescent screen may not coincide exactly with those illustrated. It is, nevertheless, equally apparent that for each condition of the line, that is, conductor reversal, one or two conductors open, a distinctively characteristic trace will appear on the screen 19 for immediate interpretation by the testman or attendant. Thus, the present invention provides for a visual and immediate check of the condition of a transmission line, and does so with a minimum of apparatus, and by means which removes the possibility of human error characteristic of previously known methods of test.

The deflecting plates of the cathode ray oscilloscope are usually defined as "horizontal" and "vertical." In the present case the plates have been oriented 45 degrees from the horizontal and vertical in order that the oscillograms achieved will assume the positions illustrated in the drawing when viewed by an attendant. The terms "horizontal" and "vertical" therefore, as employed in the specification indicate that the plates of one pair are positioned at right angles to the plates of the other pair and do not necessarily indicate that they are confined to true horizontal and vertical planes respectively.

What is claimed is:

1. In a system for routine testing a plurality of two-wire electric circuits for single and double conductor opens and conductor reverses, a source of alternating current, an oscilloscope having two pairs of deflecting plates, an electron beam and a fluorescent screen, means for inductively connecting said source of current to the input terminals of said circuits and for directly connecting said current source to one pair of said deflecting plates, and means for connecting the output terminals of said circuits to the other pair of said deflecting plates, whereby the electron beam of said oscilloscope is caused to trace on the said fluorescent screen a substantially straight line vertical pattern when said pairs of deflecting plates are connected respectively to the input and output terminals of a circuit whose line conductors are electrically continuous and are connected to corresponding input and output terminals, a substantially straight line horizontal pattern when said pairs of deflecting plates are connected respectively to the input and output terminals of a circuit whose line conductors are electrically continuous and interconnect unlike input and output terminals, a substantially straight line diagonal pattern when said pairs of deflecting plates are connected respectively to corresponding input and output terminals of a circuit whose line conductors are open, and a substantially angular elliptical pattern when said pairs of deflecting plates are connected to corresponding input and output terminals of a circuit only one of whose conductors is open.

2. In combination, a line having tip and ring conductors extending between input and output terminals, an oscilloscope having two pairs of deflecting plates, an electron beam and a fluorescent screen, circuit means for connecting one pair of deflecting plates to the input terminals of said line, circuit means for connecting the other pair of deflecting plates to the output terminals of said line, and means for inductively impressing an alternating current voltage on different combinations of said deflecting plates depending upon the manner in which the input and output terminals of said line are interconnected by the conductors thereof and whether an open exists in one or both of the conductors thereof, whereby said beam produces on said fluorescent screen a substantially straight line pattern when corresponding input and output terminals of said line are interconnected by the conductors of said line, a substantailly straight line pattern at right angles to said first pattern when unlike input and output terminals of said line are interconnected by the conductors of said line, a substantially straight line diagonal pattern when the conductors of said line are electrically discontinuous, and a substantially elliptical diagonal pattern when but one of the conductors of said line is electrically continuous.

JOHN A. ROBINSON.